United States Patent
Thielemann

Patent Number: 6,138,611
Date of Patent: Oct. 31, 2000

[54] DOG COAT

[76] Inventor: Inge Thielemann, P.O. Box 4686, Blaine, Wash. 98231

[21] Appl. No.: 09/443,332

[22] Filed: Nov. 19, 1999

Related U.S. Application Data

[60] Provisional application No. 60/111,720, Dec. 9, 1998.

[51] Int. Cl.[7] .............................. A01K 13/00; B68C 5/00
[52] U.S. Cl. ............................................. 119/850; 54/79.1
[58] Field of Search .................................. 119/850, 907; 54/79.1, 79.2, 79.4

[56] References Cited

U.S. PATENT DOCUMENTS

| D. 372,563 | 8/1996 | Waugh, Jr. ............................ D30/145 |
| 1,595,834 | 8/1926 | Griffiths . | |
| 2,222,705 | 11/1940 | Conlon .................................... 119/850 |
| 2,831,306 | 4/1958 | Brenton . | |
| 3,141,443 | 7/1964 | Huey . | |
| 3,918,238 | 11/1975 | Iozzio . | |
| 4,355,600 | 10/1982 | Zielinski ................................. 119/850 |
| 4,385,592 | 5/1983 | Goldstein . | |
| 5,060,458 | 10/1991 | Curtis ........................................... 54/79 |
| 5,359,963 | 11/1994 | Jesse, Jr. et al. ...................... 119/850 |
| 5,458,094 | 10/1995 | Proshan .................................. 119/850 |
| 5,839,395 | 11/1998 | Kelley et al. ........................... 119/850 |
| 6,009,693 | 1/2000 | Hsi-Chang ............................... 54/79.1 |

FOREIGN PATENT DOCUMENTS

| 16893 | of 1909 | United Kingdom . |
| 2039704 | 8/1980 | United Kingdom . |

Primary Examiner—Thomas Price
Attorney, Agent, or Firm—Richard C. Litman

[57] ABSTRACT

A dog coat for insulating a dog's body in cold weather. The coat is made from an elastic material for permitting the coat to expand and contract with a dog's body movements. The coat material is also water-repellant to protect the coat from water damage. A front portion of the coat has a concave portion forming a voided area when the coat is worn by a dog for permitting a dog's genitals to remain exposed while the coat covers a substantial portion of a dog's body. A plurality of fasteners are fixedly attached to a portion of the coat for releasably fastening two portions of the coat together around a dog.

7 Claims, 5 Drawing Sheets

DOG COAT

CROSS-REFERENCE TO RELATED APPLICATION

This application claims the benefit of U.S. Provisional Patent Application Ser. No. 60/111,720, filed Dec. 9, 1998.

BACKGROUND OF THE INVENTION

1. Field of the Invention

The present invention relates generally to protective garments for animals, such as dogs, and in particular to an insulated coat for a dog. While the invention, as will be apparent, is designed to be useful for many different four-legged domestic animals, it is principally directed to the dog and for this reason and for simplicity of discussion, the dog will be exclusively referred to hereafter.

2. Description of Related Art

Prior to the domestication of canines, there was seldom any discussion of whether a dog's physiology, physique, fur and other physical characteristics were suitable for the environment which it inhabited. Natural selection made relatively quick work of canines that were unsuited for their surroundings. This natural selection ultimately resulted in the establishment of bloodlines for particular breeds. Bloodlines assured, among other things, that desirable genetic characteristics of the bloodline flourished, while other less desirable attributes became attenuated over time.

With the domestication of canines, the environmentally-specific physical attributes of a dog tended to become less important to the dog's survival and more central to a dog's attractiveness as a pet. Dogs were taken into the home and moved to new locales, and climates, with their roving owners. A long-haired arctic dog might find himself in Miami, while a Mexican Chihuahua might find himself in Antarctica.

The use of dog coats is known in the prior art. More specifically, dog coats heretofore devised and utilized for the purpose of protecting dogs from inclement weather are known to consist basically of familiar, expected, and obvious structural configurations, not withstanding the myriad of designs encompassed by the crowded prior art which have been developed for the fulfillment of countless other objectives and requirements.

Prior art dog coats have generally failed to provide comfortable protection against cold weather for the animal. Such prior art garments often irritate a dog when the dog's chest cavity expands due to laying down or during heavy exercise. For example, several known dog coats use belts that get fastened around a dog's back and chest to secure a coat on the dog. A common shortcoming of these coats is the inability of the belts to expand with a dog's chest cavity. Another shortcoming of certain known dog coats is they lack a configuration that permits a dog to urinate and defecate freely while wearing a coat. Still another shortcoming of certain known dog coats is the complexity involved in putting the dog coat on a dog.

None of the above inventions and patents, taken either singly or in combination, is seen to describe the instant invention as claimed.

SUMMARY OF THE INVENTION

A dog coat is provided for insulating a dog's body from cold weather. The dog coat is defined by a front covering or section fixedly attached to a back covering or section. The front covering is defined by a top edge, a first side edge, a second side edge, and a bottom edge. The front covering is further defined by an upper portion, a middle portion, and a lower portion. At least one first female fastener is fixedly attached to opposing ends of the top edge for releasably attaching the upper portion to a back covering. At least one second female fastener is fixedly attached to the second side edge at the lower portion for releasably attaching the lower portion to a back covering.

The bottom edge is substantially concave forming a voided area for permitting a dog's genitals, particularly a male dog, to remain exposed when the coat is being worn by the dog. The back covering is defined by a top edge, a first side edge, a second side edge, a bottom edge. The back covering is further defined by a upper portion and a lower portion. The upper portion of the back covering has a protruding portion at each of two opposing ends of the top edge for wrapping around a substantial portion of a dog's shoulders. A first male fastener is fixedly attached to each protruding section for releasably attaching the back covering to a front covering. At least one second male fastener is fixedly attached to the second side edge for releasably attaching the second side edge to the front covering. The first side edge of the front covering is fixedly attached to the first side edge of the back covering for fixedly attaching the front covering to the back covering. Each covering is made of an elastic material for permitting the coat to expand and contract with a dog's body movements. The elastic material is also water-repellant for repelling water from the coat.

Accordingly, it is a principal object of the invention to provide a dog coat that is made of an elastic material for permitting the coat to expand and contract with a dog's body movements. It is another object of the invention to provide a dog coat that is made of a water-repellant material for repelling water from the coat material. It is a further object of the invention to provide a dog coat having a configuration that permits a dog to freely urinate and defecate while wearing the coat. Still another object of the invention is to provide a dog coat that can be easily put on a dog.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
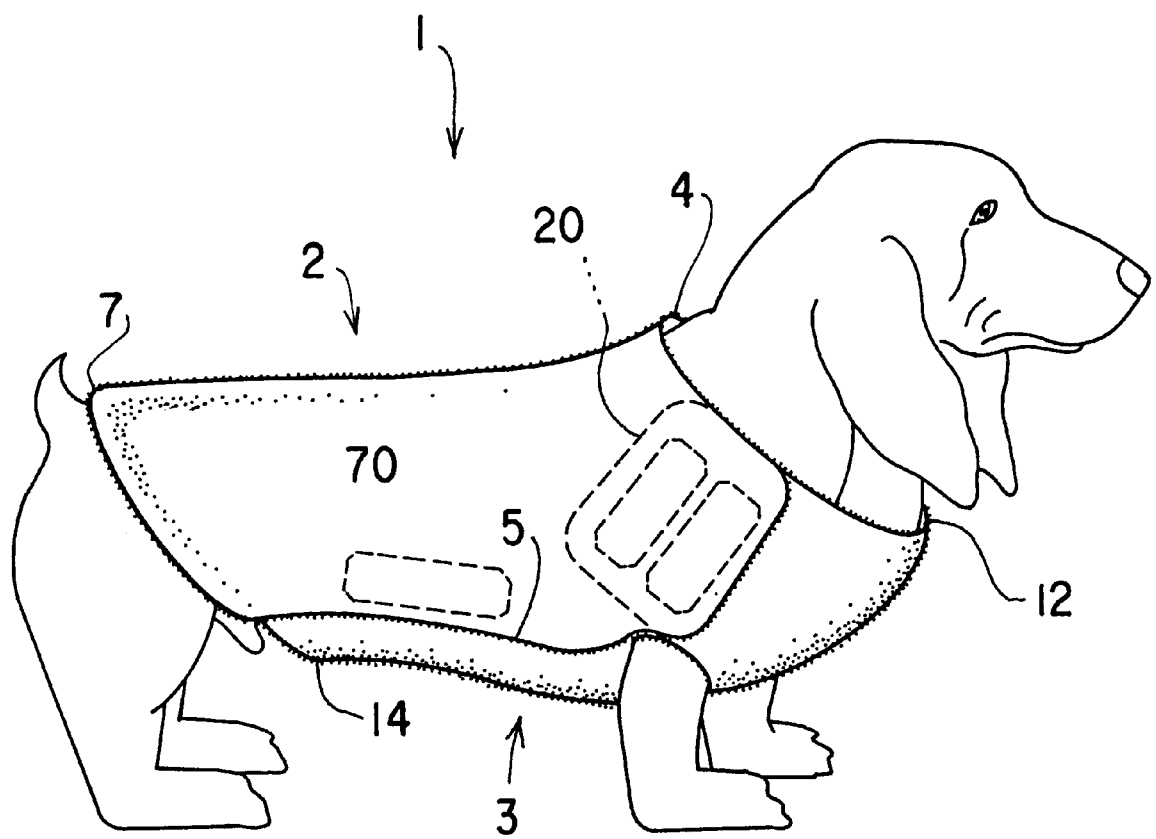
FIG. 1 is an environmental, perspective view of a dog coat according to the present invention.
Figure 2:
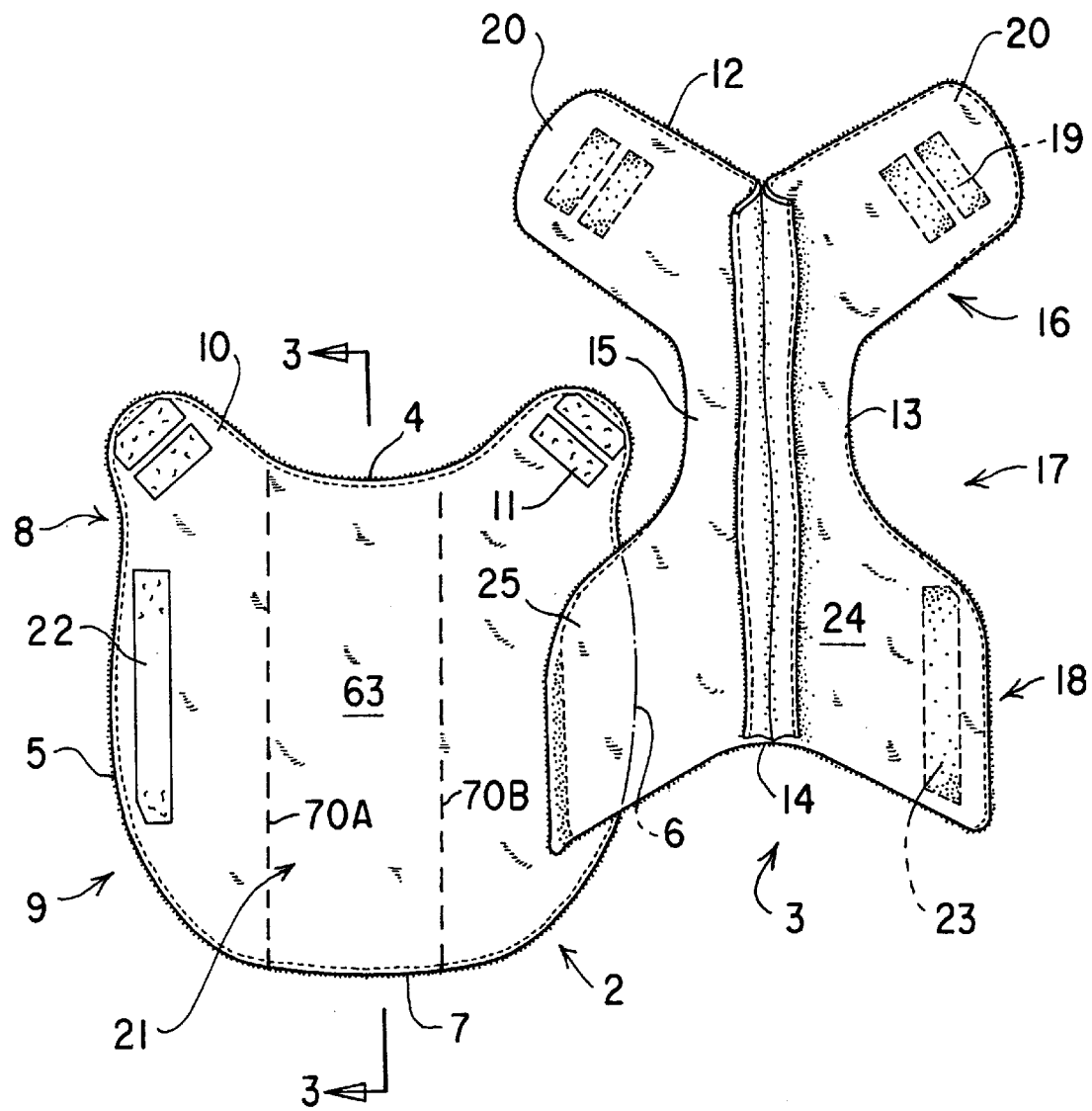
FIG. 2 is a plan view of a dog coat according to a first embodiment of the present invention.

The present invention is a dog coat for insulating a dog from cold weather. An environmental view of a dog wearing a dog coat 1 according to a first embodiment of the invention is shown in FIG. 1. A plan view of the dog coat 1 is shown in FIG. 2. The dog coat 1 is generally defined by a back covering 2 fixedly attached to a front covering 3 for respectively covering the dorsal and a ventral portions of a dog's body. Preferably, the back covering 2 is fixedly attached to the front covering 3 by conventional stitching.

The back covering 2 is defined by a top edge 4, a first side edge 5, a second side edge 6, and a bottom edge 7. The back covering 2 is further defined by an inside surface 21 (FIG. 2Y and an outside surface 70 (FIG. 1). The inside surface 21 is the surface of the back covering that gets placed directly on a dog when the dog coat 1 is worn. The outside surface 70 is the surface that remains exposed when the dog coat is worn. Preferably, the coat is made of a fleece material. The fleece material is fluffy on one side and smooth on the other side. Preferably, the fluffy side is used as the inside surface 21 for providing comfort and insulation to a dog's body. The smooth side of the fleece material is used as the outside surface 70 because it is less absorbent than the fluffy side, thereby providing some protection against water absorption.

The back covering 2 is still further defined by an upper back portion 8 and a lower back portion 9. Formed in the upper back portion 8 at each of two opposing ends thereof is a protruding portion 10 for covering a substantial portion of a dog's neck and shoulders. Fixedly attached to each protruding portion 10 on the inside surface 23 is at least one first male fastener 11 for permitting each protruding portion 10 to be releasably attached to the front covering 3. Preferably, the first male fastener 11 is a hook and loop fastener (VELCRO). Preferably also, the first male fastener 11 is fixedly attached to each protruding portion 10 by conventional stitching.

Extending from the top edge 4 to the bottom edge 7 are a pair of seams 70A,70B, which provide a break line permitting the back portion 2 to fall more naturally over the dog's back. The seams 70A,70B parallel one another, which configuration has been found by the inventor to conform the back portion 2 to the back of a dog better than conventional techniques used by tailors, such as darts.

Fixedly attached to the inside surface 23 of the back covering 2 approximately at the middle of the first side edge 5 is at least one second male fastener 22 for releasably attaching the middle of the first side edge 5 to the front covering 3. Preferably, the second male fastener 22 is fixedly attached to the back covering 2 by conventional stitching.

The front covering 3 is generally defined by a top edge 12, a first side edge 13, a second side edge 15, and a bottom edge 14. The front covering 3 further defines an inside surface 24 and an outside surface 70. The inside surface 24 is the portion of the front covering that gets placed directly around a dog's abdominal area while the outside surface 70 remains exposed to a surrounding environment. Preferably, the inside surface 24 is fluffy for providing comfort and insulation to a dog's body while the outside surface is smooth for providing protection against water absorption.

The front covering 3 is still further defined by an upper portion 16, a middle portion 17, and a lower portion 18. The upper portion 16 has a upper protruding portion 20 formed in each of two opposing ends thereof for covering a substantial portion of a dog's neck and shoulders. Fixedly attached to each upper protruding portion 20 on the outside surface 70 is at least one first female fastener 19 for releasably attaching the protruding portion 20 to the back covering 2. Preferably, the first female fastener is a hook and loop fastener (VELCRO). Preferably too, the at least one female fastener 19 is fixedly attached to each upper protruding portion 20 by conventional stitching.

The lower portion 18 is defined by a first lower protruding portion 25' and a second lower protruding portion 25, each formed in opposing ends thereof. Fixedly attached to the first lower protruding portion 25' on the outside surface 70 near the first side edge 13 is at least one second female fastener 23 for releasably attaching the first lower protruding portion 25' to the back covering 2. Preferably, the second female fastener 23 is a hook and loop fastener. The outside surface 70 of the second lower protruding portion 25 is fixedly attached to the inside surface 21 of the back covering 2 near the second side edge 6 such that the upper portion 16 of the front section 3 extends substantially beyond the upper portion 8 of the back section 2 when the dog coat 1 is not being worn. Preferably, the second lower protruding portion 25 is fixedly attached to the back covering 2 by conventional stitching.

Figure 3:
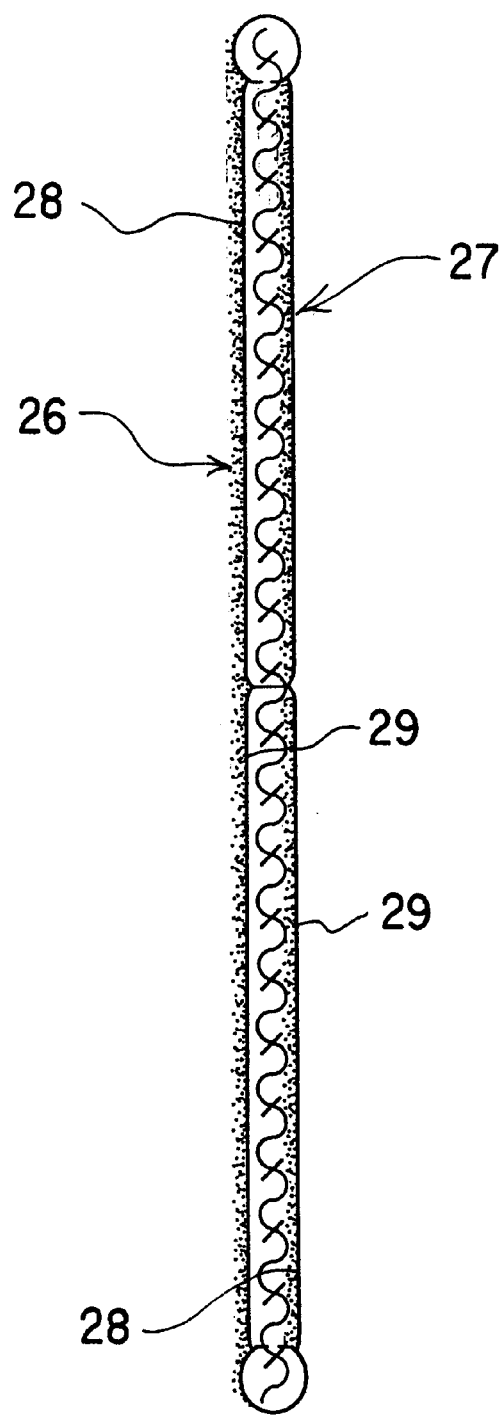
FIG. 3 is a cross-sectional view of the material of a dog coat according to the present invention.

Further details relating to construction of the coat can best be appreciated by referring to FIG. 3. FIG. 3 shows a cross-section of the dog coat taken along line 3—3 in FIG. 2 according to a preferred embodiment. The dog coat 1 is constructed of two layers of the same material—an inside layer 26 and an outside layer 27. According to the preferred embodiment, a fleece material is used. Each layer of fleece material also has an inside surface 28 and an outside surface 29. As illustrated in FIG. 3, the inside surface 28 is the fluffy side of fleece material while the outside surface 29 is the smooth side of the same material. Thus, when two layers are attached front to back, with the inside layer 26 and outside layer 27 fixedly attached to each other by conventional stitching, a fleecy inside layer 26 and a smooth outside layer 27 are formed.

Figure 5:
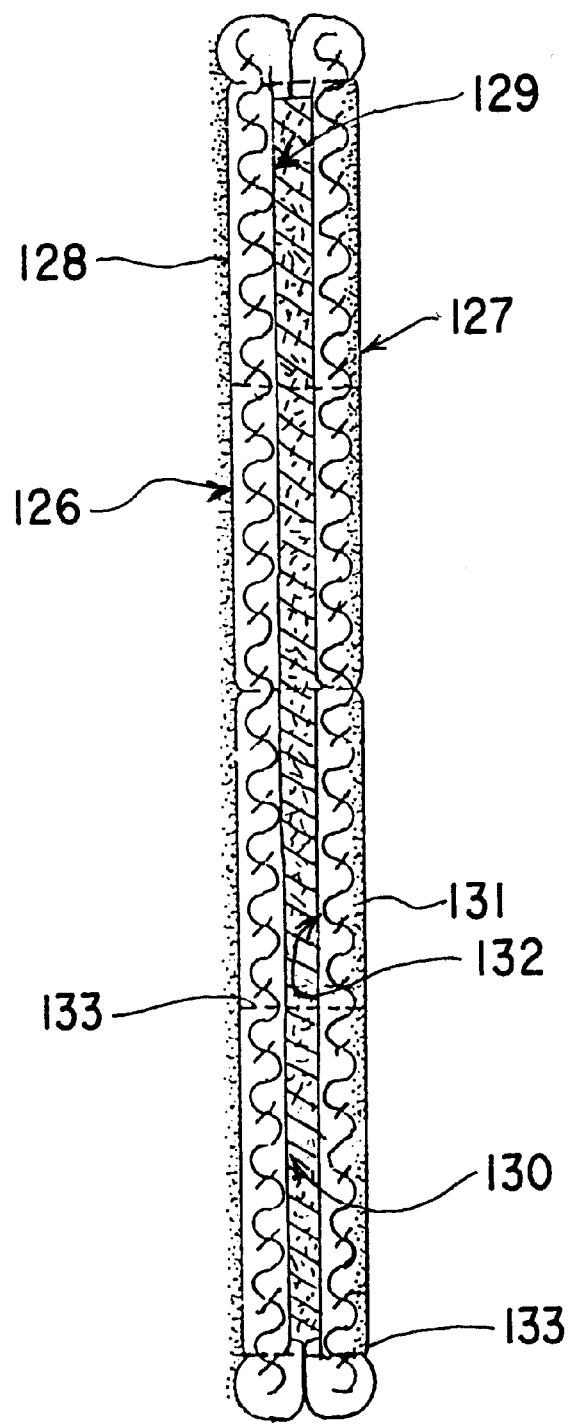
FIG. 5 is a cross sectional view showing the dog coat made of two layers of different material, and drawn to an enlarged scale.

In the alternative, as shown in FIG. 5, the dog coat 1 may be constructed of two layers of the different material—an inside layer 126 and an outside layer 127, together comprising a shell for containing an insulative batting 130. According to this embodiment, a fleece material is used as the inside layer 126, having an inside surface 128 for contacting the body of the dog. The inside surface 128 is the fluffy side of the fleece material, whereas its opposing surface 129 contacts the batting 130. The outside layer 127 may be a water-repellant material, such as a nylon high-count knit fabric, having an outside surface 131, and a corresponding opposing surface 132 which contacts the batting. The material is preferably sewn by stitching 133, using conventional techniques for securing the batting within the shell.

Figure 4:
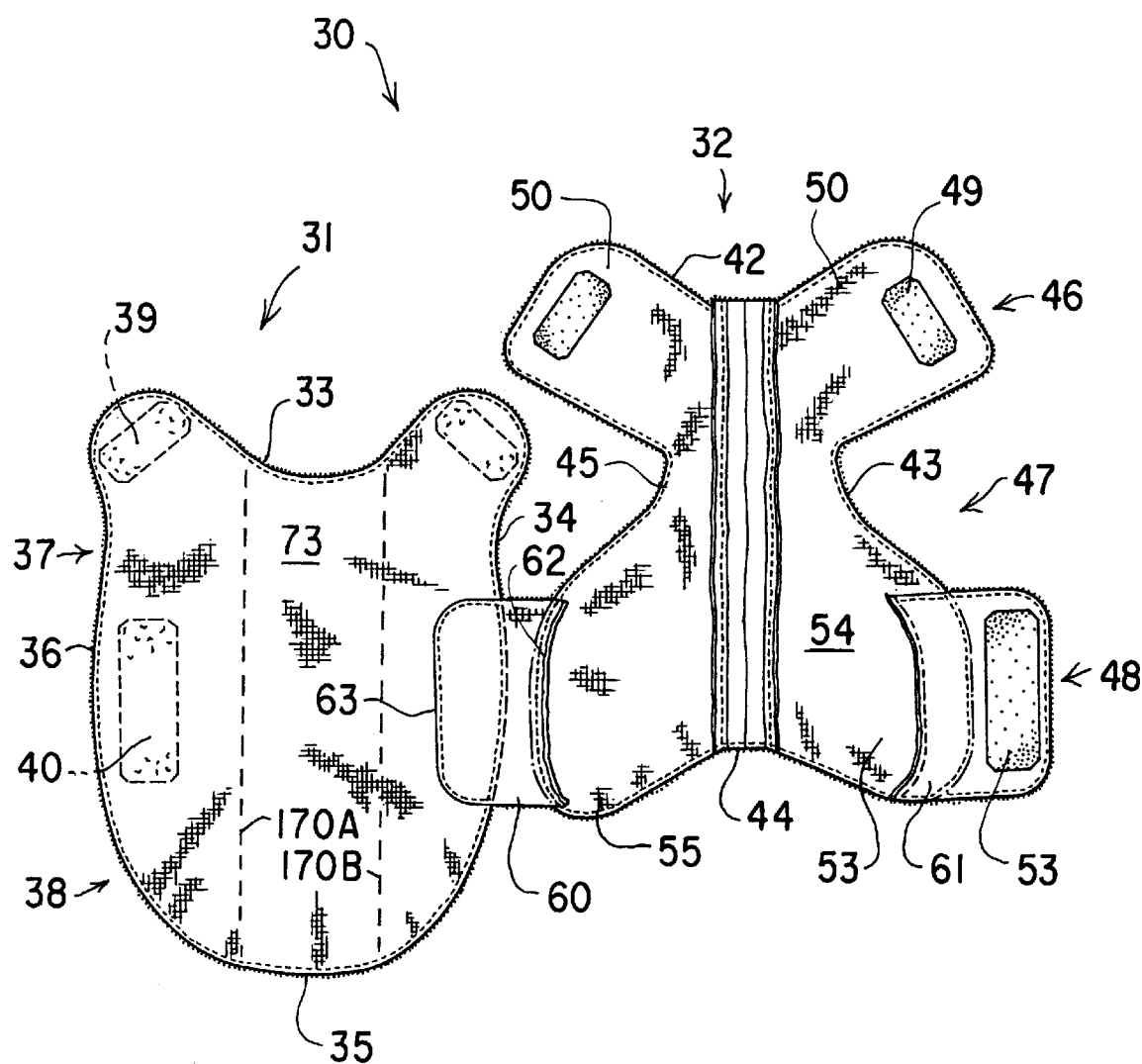
FIG. 4 is a plan view of a dog coat according to a second embodiment of the present invention.

Shown in FIG. 4 is a dog coat 30 according to a second embodiment of the invention. The dog coat 30 is generally defined by a back covering 31 fixedly attached to a front covering 32 for respectively covering a back side and a front side of a dog's body. Preferably, the back covering 31 is fixedly attached to the front covering 32 by conventional stitching.

The back covering 31 is defined by a top edge 33, a first side edge 36, a second side edge 34, and a bottom edge 35. The back covering 31 is further defined by an inside surface 73 and an outside surface (not shown). The inside surface 73 is the surface of the back covering that gets placed directly on a dog when the dog coat 30 is being worn. The outside surface (not shown) is the surface that remains exposed when the dog coat is worn. Preferably, the coat is made of a fleece material. The fleece material is fluffy on one side and smooth on the other side. Preferably, the fluffy side is used as the inside surface 73 for providing comfort and insulation to a dog's body. The smooth side of the fleece material is used as the outside surface (not shown) because it is less absorbent than the fluffy side, thereby providing added protection against water absorption.

The back covering 31 is still further defined by an upper back portion 37 and a lower back portion 38. Formed in the upper back portion 37 at each of two opposing ends thereof is a protruding portion 37 for covering a substantial portion of a dog's neck and shoulders. Fixedly attached to each protruding portion 37 on the outside surface (not shown) is at least one first male fastener 39 for permitting each protruding portion 37 to be releasably attached to the front covering 32. Preferably, the first male fastener 39 is a hook and loop fastener. Preferably also, the first male fastener 39 is fixedly attached to each protruding portion 31 by conventional stitching.

Extending from the top edge 33 to the bottom edge 35 are a pair of seams 170A,170B, which provide a break line permitting the back covering 31 to fall more naturally over the dog's back. The seams 170A,170B parallel one another, which configuration has been found by the inventor to conform the back covering 31 to the back of a dog better than conventional techniques used by tailors, such as darts.

Fixedly attached to the outside surface (not shown) of the back covering 31 approximately at the middle of the first side edge 36 is at least one second male fastener 40 for releasably attaching the middle of the first side edge 36 to the front covering 32. Preferably, the second male fastener 40 is fixedly attached to the back covering 31 by conventional stitching.

The front covering 32 is generally defined by a top edge 42, a first side edge 43, a second side edge 45, and a bottom edge 44. The front covering 32 is further defined by an inside surface 54 and an outside surface (not shown). The inside surface 54 is the portion of the front covering that gets placed directly around a dog's abdominal area while the outside surface (not shown) remains exposed to a surrounding environment. Preferably, the inside surface 54 is fluffy for providing comfort and insulation to a dog's body while the outside surface is smooth for providing added protection against water absorption.

The front covering 32 is still further defined by an upper portion 46, a middle portion 47, and a lower portion 48. The upper portion 46 has a upper protruding portion 50 formed in each of two opposing ends thereof for covering a substantial portion of a dog's neck and shoulders. Fixedly attached to each upper protruding portion 50 on the inside surface 54 is at least one female fastener 49 for releasably attaching the protruding portion 50 to the back covering 31. Preferably, the female fastener is a hook and loop fastener. Preferably too, the at least one female fastener 49 is fixedly attached to each upper protruding portion 50 by conventional stitching.

The lower portion 48 is defined by a first lower protruding portion 51 and a second lower protruding portion 55, each formed in opposing ends thereof. Fixedly attached to the first lower protruding portion 51 on the inside surface 54 is a first tab portion 61. Preferably the first tab portion 61 is fixedly attached to the first lower protruding portion 51 by conventional stitching. Fixedly attached to the first tab portion 61 is at least one second female fastener 53 for releasably attaching the first tab portion 61 to the back covering 31. Preferably, the second female fastener 53 is a hook and loop fastener. Also, preferably the second female fastener 53 is fixedly attached to the first tab portion 61 by conventional stitching.

Fixedly attached to the second lower protruding portion 55 is a second tab portion 60. The second tab portion 60 is defined by a first edge 62 and a second edge 63. By means of conventional stitching, the first edge 62 is fixedly attached to the second lower protruding portion 55. The second edge 63 is fixedly attached to the inside surface 73 of the back covering 31 by means of conventional stitching to fixedly attach the front covering 32 to the back covering 31.

Further details relating to preferred materials for making the dog coat 1 will now be described. The present invention anticipates the dog coat 1 being made out of materials having various weights for use in various environmental conditions. According to the structural features as described above of each of the embodiments, the outer layer, or outer shell, may alternatively be made from a light, medium, or heavy weight fabric. The weight of the fabric is chosen to provide a range of coats for a range of severity of weather conditions in which the dog coat 1 will be used. For example, in moderately cold weather, a light weight knitted fabric might be used for the inner and outer layers of the dog coat 1. Alternatively, in bitterly cold conditions, a heavy weight fleece might be desirable. The present invention also anticipates the shell or outer layer of the dog coat 1 being made of a water-resistant material for insulating a dog from wet environmental conditions.

According to a first variation, the dog coat 1 is made from a single layer of light weight knitted material for providing protection against moderately cold environmental conditions. Preferably, a material comprising 50% polyester and 50% cotton is used. Such knitted fabrics are chosen having elastic qualities permitting the coat to expand and contract with a dog's body movements for maximum comfort. According to a second variation, a medium weight knitted fabric is used for making the dog coat 1. As noted in the various embodiments, the dog coat has two layers—an outside layer and an inside layer. The inside layer is made of a synthetic fleece or fur, fake sheepskin or "Funfur". Preferably, the inside layer is 90% polyester and 10% acrylic, and, the outside layer is made of 100% polyester. According to a third version, a heavy weight knitted fabric is made by joining an outer layer and an inner layer of material. In this instance, preferably, the outside layer is a synthetic fleece or Funfur, such as Polartec™, made of 100% polyester. The inside layer is a heavier weight sheepskin than that recited above for the medium weight dog coat. Preferably, an inside layer like Sherpa™ insulative fabric is used for insulating a dog against extremely cold environmental conditions.

A fourth version incorporates a variety of materials which are used to create the batted shell. As described above with reference to FIG. 5, the dog coat 1 is preferably made of an outer layer and an inner layer to form a shell which forms a pocket for insulative batting. The outer layer is preferably made of 100% nylon. According to one preferred embodiment, the outer layer is made using Insolon™. Insolon™ is made of a nylon material that is 100% waterproof. Alternatively, according to another preferred embodiment, the outer layer can be made using Ciere™. Ciere™ is made from nylon and is water-resistant but not water-proof. The batting comprises a polyester loose fill or batt for providing thermal insulation. The inner layer is made of polyester fleece, chosen from the above described weights.

It is to be understood that the present invention is not limited to the sole embodiments described above, but encompasses any and all embodiments within the scope of the following claims.

I claim:

1. A dog coat for insulating a dog's body from cold weather, said dog coat comprising:

a front section for covering a front side of a dog's body; and a back section for covering a dog's back;

said front section having an upper portion, a middle portion, and a lower portion, said upper portion including a first protruding end and a second opposing protruding end, each said protruding end having at least one hook and loop fastener fixedly attached thereto, said lower portion extending outwardly from said middle portion and being defined by a first side edge, a second side edge, and a substantially convex bottom edge;

at least one strip of hook and loop fastener fixedly attached to said front section adjacent the first side edge;

said back section having an upper portion and a lower portion, said upper portion including a third protruding end and a fourth opposing protruding end, each said protruding end having at least one hook and loop fastener fixedly attached thereto for releasably mating with said at least one hook and loop fastener on said front section, said back section being defined by a top edge, a third side edge, a fourth side edge, and a bottom edge, said back section being fixedly attached along its fourth side edge to the lower portion of said front section along its second side edge, such that the upper portion of said front section extends beyond the upper portion of the back section when said dog cover is not being worn;

at least one strip of cooperating hook and loop fastener fixedly attached to said back section adjacent the third side edge approximately midway between the top edge and the bottom edge of said back section, said strip of cooperating hook and loop fastener releasably mating with said strip of hook and loop fastener on said front section.

2. The dog coat according to claim 1, wherein said back section includes a pair of parallel seams extending from the top edge to the bottom edge.

3. The dog coat according to claim 1, wherein said front section and said back section are made of a fleece material.

4. The dog coat according to claim 1, wherein said back section is fixedly attached to the lower portion of said front section by stitching.

5. The dog coat according to claim 1, wherein said back section is fixedly attached to said front section by means of a tab extending between the fourth side edge of the back section and the lower portion of said front section.

6. The dog coat according to claim 1, wherein said back section includes an inside surface having each said at least one hook and loop fastener and said at least one strip of hook and loop fastener fixedly attached to the inside surface.

7. The dog coat according to claim 6, wherein said front section includes an outside surface having each said at least one hook and loop fastener and said at least one strip of cooperating hook and loop fastener fixedly attached to the outside surface.

* * * * *